United States Patent
Dowlatkhah et al.

(10) Patent No.: US 10,291,764 B2
(45) Date of Patent: May 14, 2019

(54) METHOD AND SYSTEM TO DYNAMICALLY AND INTELLIGENTLY ENABLE ACCESS TO UAVS IN ANY LOCATION

(71) Applicant: AT&T Intellectual Property I, L.P., Atlanta, GA (US)

(72) Inventors: Sangar Dowlatkhah, Alpharetta, GA (US); Zhi Cui, Sugar Hill, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 15/193,993

(22) Filed: Jun. 27, 2016

(65) Prior Publication Data

US 2017/0374190 A1  Dec. 28, 2017

(51) Int. Cl.
*H04M 1/725* (2006.01)
*H04W 12/06* (2009.01)
*H04W 12/08* (2009.01)

(52) U.S. Cl.
CPC ....... *H04M 1/72533* (2013.01); *H04W 12/06* (2013.01); *H04W 12/08* (2013.01)

(58) Field of Classification Search
CPC .. H04M 1/72533; H04W 12/06; H04W 12/08
See application file for complete search history.

(56) References Cited

U.S. PATENT DOCUMENTS

| | | | |
|---|---|---|---|
| 6,122,572 A * | 9/2000 | Yavnai | G05D 1/0088 342/13 |
| 7,765,038 B2 | 7/2010 | Appleby et al. | |
| 8,644,512 B2 | 2/2014 | Khazan et al. | |
| 8,755,950 B2 | 6/2014 | Johansson | |
| 8,788,118 B2 | 7/2014 | Matos | |
| 2014/0163852 A1 | 6/2014 | Borri et al. | |
| 2015/0321758 A1 | 11/2015 | Sarna, II et al. | |
| 2015/0336667 A1 | 11/2015 | Srivastava et al. | |
| 2016/0016672 A1 | 1/2016 | Matos | |
| 2016/0288905 A1* | 10/2016 | Gong | H04L 63/101 |

FOREIGN PATENT DOCUMENTS

| | | |
|---|---|---|
| CN | 102215235 A | 10/2011 |
| CN | 104809918 A | 7/2015 |
| CN | 104955047 A | 9/2015 |
| KR | 10-2014-0137826 A | 12/2014 |

* cited by examiner

*Primary Examiner* — Anne M Antonucci
(74) *Attorney, Agent, or Firm* — BakerHostetler

(57) ABSTRACT

A method and system for enabling access to an unmanned aerial vehicle are disclosed. The method includes receiving a request from a user for access to an unmanned aerial vehicle through a control system. The method further includes making a determination of whether to grant access to the control system. If the determination is made to grant access the control system then receiving alternate mission parameters for an alternate mission from the user. The method also includes making a decision about whether to implement the alternate mission based on a set of predetermined policies. If the decision is to implement the alternate mission then implementing the alternate mission and saving the alternate mission parameters.

17 Claims, 8 Drawing Sheets

METHOD AND SYSTEM TO DYNAMICALLY AND INTELLIGENTLY ENABLE ACCESS TO UAVS IN ANY LOCATION

TECHNICAL FIELD

Embodiments of the present inventions relate to methods and systems for controlling unmanned vehicles (UVs), and more particularly to methods and systems that enable control of an Unmanned Arial Vehicle ("UAV") by more than one entity in any location.

BACKGROUND

Today a large number of companies are greatly expanding their use of UAVs. UAVs have been used for military applications, search-and-rescue missions, scientific research, delivering goods, and other uses. UAVs can include a plurality of airborne platforms or air vehicles, each carrying a plurality of sensors that may be used to collect information about an area under surveillance or to deliver a payload to a certain location. The airborne platforms may communicate with users, which may include persons or equipment, that desire access to data collected by the sensors or desire to control the UAV. More sophisticated UAVs have built-in control and/or guidance systems to perform low-level human pilot duties, such as speed and flight path surveillance, and simple pre-scripted navigation functions. UAV security is a high priority in aerospace and defense applications. Secure communication links are vital for UAV operation, both to control the UAV based on mission objectives and to deliver data reliably to mission controllers on the ground. Encryption and decryption are inherent requirements, adding complexity and cost in the electronics.

While UAVs are being deployed to perform various tasks, there are numerous security measures being taken so there is no chance of security breach while these UAVs are flying in open skies. When communication is between two pre-defined entities in this case, the UAV and the command center, it is fairly simple to secure such communication with necessary encryption and usual secure access enabling mechanisms. However, enabling UAVs to communicate with a number of users creates potential security issues, especially if those users are dynamically added to a list of operators who can access and command the UAV. The problem is not only how to grant access to users securely, which is a major security concern, but also to manage the level of control over the UAV and to enable the UAV to decide intelligently to respond to the commands of the users with limited resources while flying from one location to another location.

There is a need to securely enable access by different users in different locations to a UAV. There is also a need for the UAV to be securely accessed by multiple entities to perform alternate tasks while prioritizing not only its primary task over secondary objectives but also prioritizing the users accessing the UAV.

SUMMARY

In an embodiment, a method for dynamically and intelligently enabling secure access to UAVs in any location may comprise receiving a request from a user for access to a UAV through a control system and making a determination of whether to grant access to the control system. If the determination is to grant access then the method includes the step of receiving alternate mission parameters for an alternate mission. The method may also comprise making a decision about whether to implement the alternate mission and if the decision is to implement the alternate mission then implementing the alternate mission.

In another embodiment, a system to dynamically and intelligently enable access to unmanned vehicles in any location may comprise an unmanned vehicle, an unmanned vehicle control system; and a mission policy management subsystem coupled to the unmanned vehicle control system. The mission policy management subsystem may comprise a mission information subsystem, an environment information subsystem, and a mission decision engine coupled to the mission information subsystem and the environment information subsystem.

In another embodiment, a method of controlling an unmanned vehicle may comprise determining whether a user has authorization to control the unmanned vehicle; if the user has authorization, then receiving alternate mission parameters from the user. The method may also comprise making a determination about whether to perform an alternate mission based on the alternate mission parameters, a set of policies, and information about a state of the unmanned vehicle. If a determination is made that the alternate mission should be performed, then performing the alternate mission, and storing information about the determination. If it is determined that the alternate mission should not be performed then determining whether there is a second unmanned vehicle that may be capable of performing the alternate mission.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

System Environment.

Figure 1:
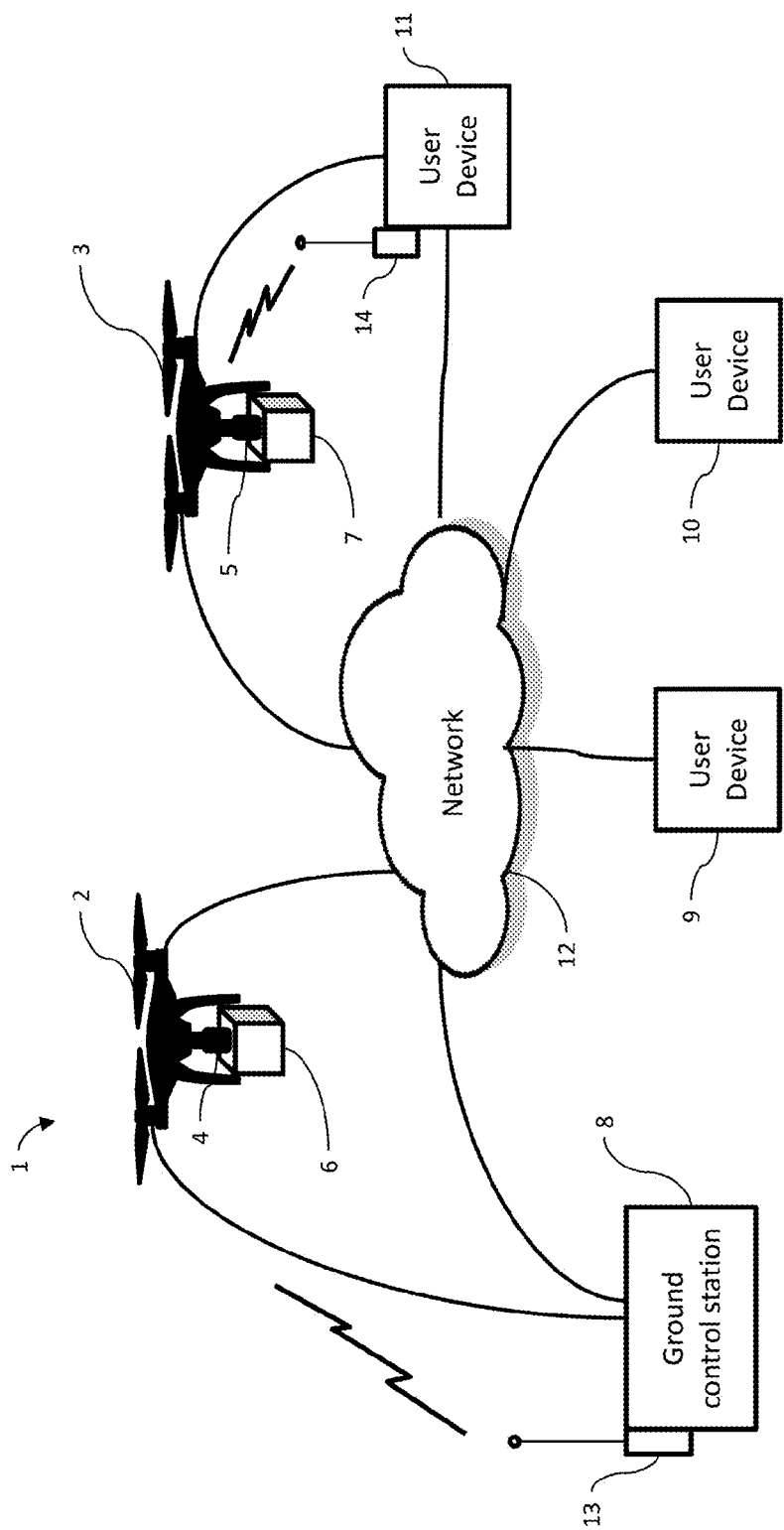
FIG. 1 is a schematic representation of a system environment in which the methods and systems to dynamically and intelligently enable access to UAVs in any location may be implemented.

Illustrated in FIG. 1 is a schematic representation of a system environment 1 in which the present invention operates. The system environment 1 includes UAV 2 and UAV 3 each carrying sensors (sensor 4 and sensor 5) for collecting information or payloads (payload 6 and payload 7) for delivery. Although two UAVs are illustrated in FIG. 1, it is contemplated that the system environment 1 would encompass a plurality of UAVs. UAV 2 and UAV 3 may communicate with a ground control station 8 and a plurality of user devices (user device 9, user device 10, and user device 11). Ground control station 8 may communicate with UAV 2 through a network 12 or an RF transmitter 13. Similarly user device 11 may communicate with UAV 3 through the network 12 or an RF transmitter 14. Network 12 may be a distributed network such as the Internet or a wireless cellular network. User device 9, user device 10 and user device 11 may comprise any wireless device such as a cell phone, a smart phone, personal data assistants (PDA) or a personal computer such as a desktop, a laptop computer or a tablet computer. Ground control station 8 may be part of a command and control center (not shown). The command and control center is typically a facility that operates as the operating entity's dispatch center, surveillance monitoring center, coordination office and alarm monitoring center all in one. Command and control centers are operated by the operating entity.

UAV Control System.

Figure 2:
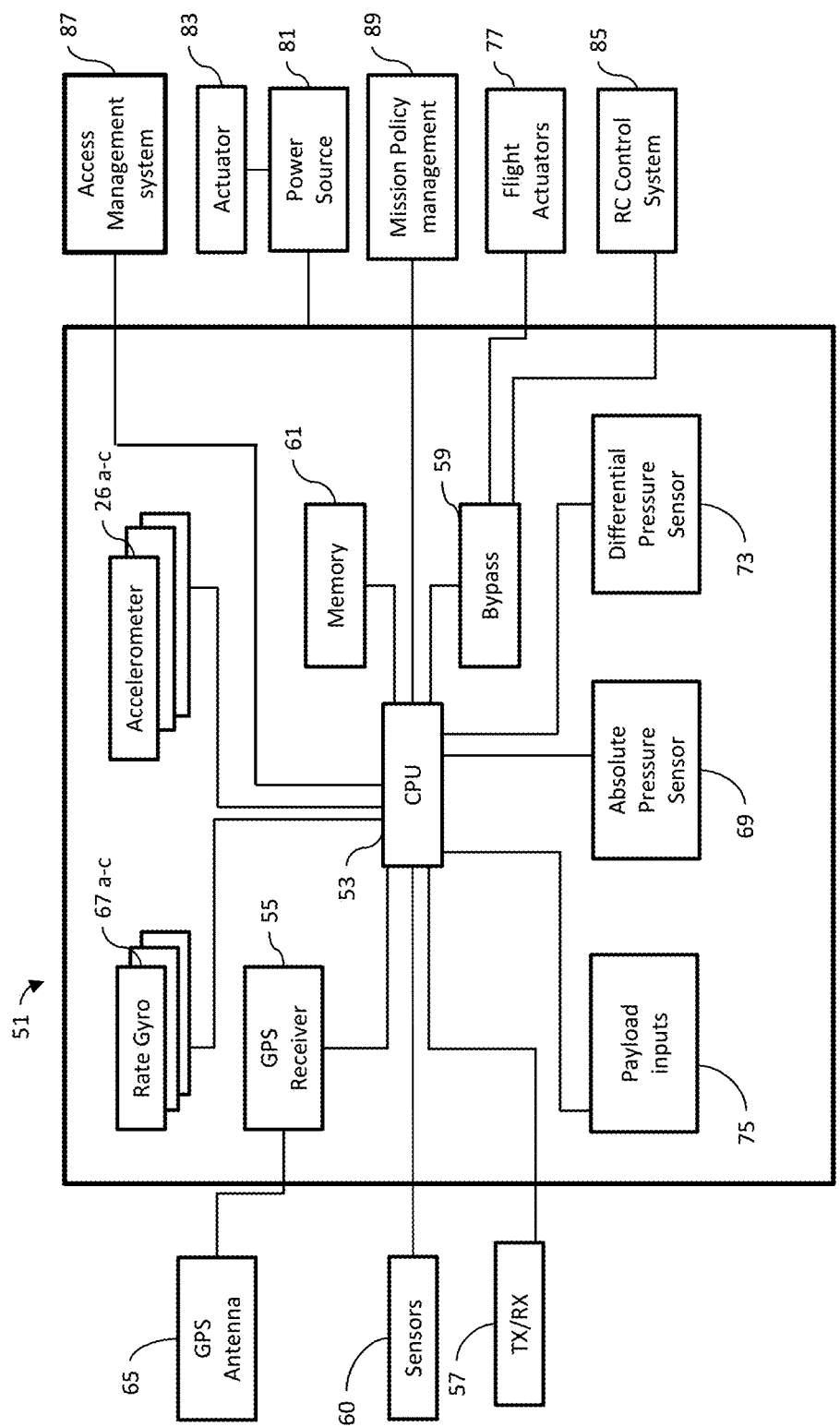
FIG. 2 is a system diagram of a UAV control system.

FIG. 2 is a block diagram illustrating the main hardware and system components of one embodiment of a UAV control system 51. The UAV control system 51 includes a central processing unit (CPU 53), which is responsible for processing data and executing commands and instructions. The CPU 53 may be responsible for processing sensor data, handling I/O to a GPS receiver 55, a UAV transmitter/receiver 57, and bypass circuit 59, thereby enabling communications with the ground station. The UAV control system 51 is provided with sufficient memory to store the autopilot source code storage and effect runtime execution. The CPU 53 is in electronic communication with various sensors and is responsible for processing raw data from the various sensors such as sensor 60 and storing and transmitting the data. Data is stored in memory 61, which is in electronic communication with the CPU 53. The memory 61 may include random access memory (RAM), flash memory or any other type of memory technology currently available. To control a UAV such as UAV 2 in FIG. 1, the UAV control system 51 must have access to the location coordinates of UAV 2. These coordinates are measured using the GPS receiver 55 that is in electronic communication with the CPU 53. The GPS receiver 55 receives its data through a GPS antenna 65. The fixed rotational rates of UAV 2 may be measured by rate gyros 67 *a*, 67 *b*, and 67 *c* which are in electronic communication with the CPU 53. The rate gyros 67 *a*, 67 *b* and 67 *c* are disposed to enable sensing off the rotational rates about the body axes of the UAV 2. The altitude of the UAV may be measured using an absolute pressure sensor 69 that is in electronic communication with the CPU 53. Acceleration in the x, y, and z axes may be measured by accelerometers 26 *a*, 26 *b*, and 26 *c* which are in electronic communication with the CPU 53. The velocity of UAV 2 may be measured using a differential pressure sensor 73 in electronic communication with the CPU 53. The differential pressure sensor 73 outputs a voltage based on the difference in pressure between its two external ports. A pitot tube is connected to one of the ports and the other is left open to the ambient air. The flow of air against the Pitot tube causes a pressure difference proportional to the speed of the air. The corresponding voltage produced by the differential pressure sensor 73 is used to calculate the airspeed of the UAV 2. The CPU 53 may be also in electronic communication with payload inputs 75 which may include data from a video processing unit or any other data that involves a payload (such as payload 6) on the UAV. The UAV is controlled using flight actuators 77 which include servos in electronic communication with the CPU 53 that control the flight of the UAV 2. The bypass circuit 59 may be provided to allow a user to take control of the UAV 2. The UAV control system 51 is electrically connected to a power source 81. In one embodiment the power source 81 may include a plurality of batteries. The power source 81 may be used to power the UAV control system 51 and connected accessories. The power source 81 may also be used to power an actuator 83 that propels the UAV 2. The UAV control system 51 may be provided with an RC control system 85 that allows a user to take control of a UAV (such as UAV 3) using an RF transmitter such as RF transmitter 14 or RF transmitter 13 shown in FIG. 1.

The UAV control system 51 may interact with an access management system 87 and a mission policy management system 89, which are described in more detail below, and that control access to the UAV control system 51 by user devices such as user device 11 (shown in FIG. 1). The access management system 87 and the mission policy management system 89 may be implemented in the UAV 2 or in the network 12.

Ground Control Station.

Figure 3:
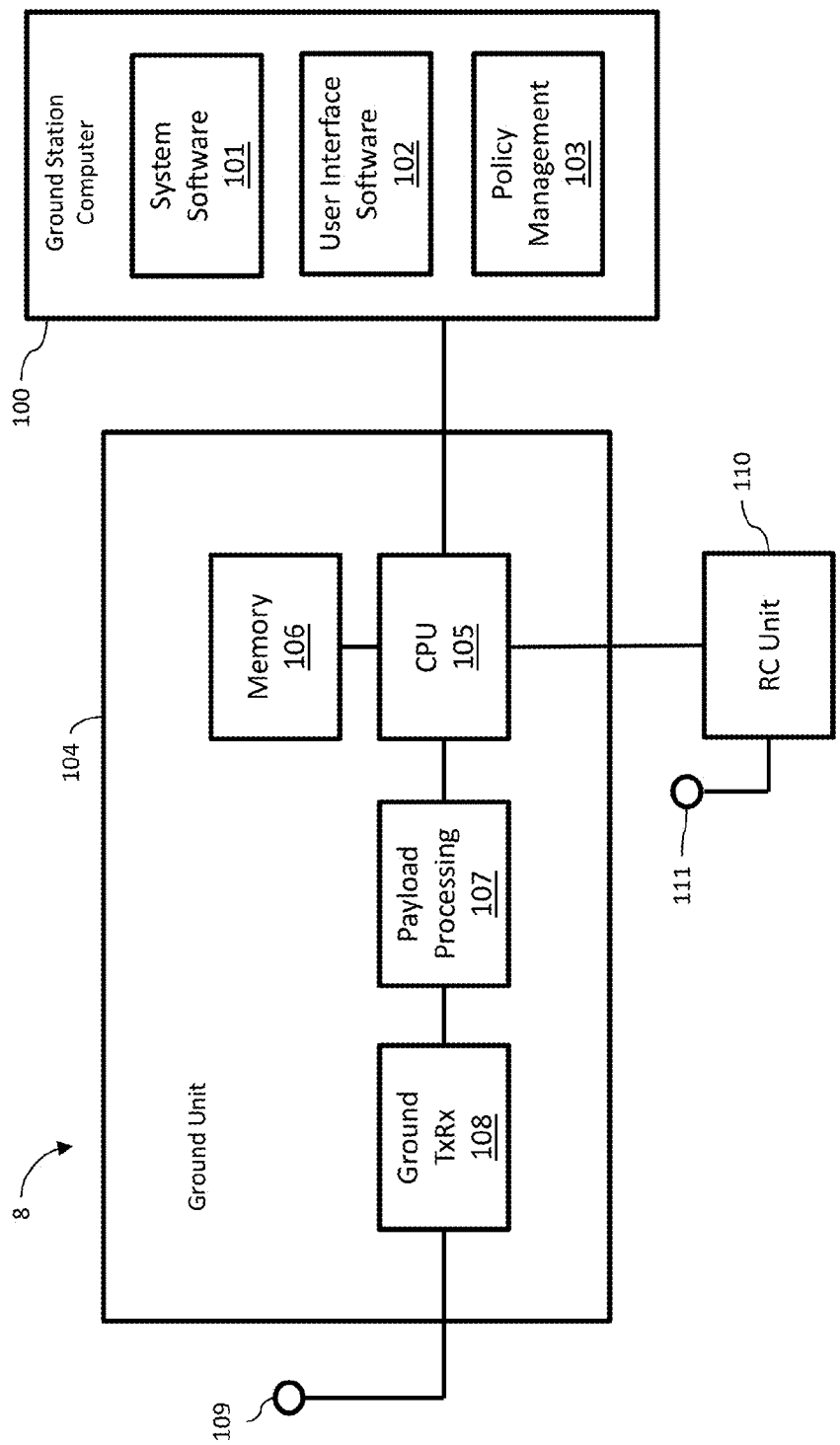
FIG. 3 is a system diagram of an embodiment of a UAV ground control station.

FIG. 3 is a block diagram illustrating the main hardware components of a ground control station 8. The ground control station 8 includes a ground station computer 100. The ground station computer 100 may be a laptop computer, a desktop computer, a personal digital assistant, a tablet PC, a wireless device such as a smart phone or similar devices. The ground station computer 100 runs ground station system software 101 as well as user interface software 102. The ground station computer 100 may also run policy management software 103 that provides mission management parameters to the UAV during operations. The ground station computer 100 is in electronic communication with a ground unit 104. Electronic communication between the ground station computer 100 and the ground unit 104 may be accomplished via a serial or USB port. Ground unit 104 may include CPU 105, memory 106, a payload processing system 107, a ground transmitter/receiver 108, and a ground antenna 109. CPU 105 processes data from the ground station computer 100 and the UAV such as UAV 2 in FIG. 1. The payload processing system 107 processes any payload data received from the UAV control system 51, (shown in FIG. 2), or payload commands from the ground station computer 100. The payload processing system 107 may also be connected directly to CPU 105 or the ground station computer 100. Data from the payload processing system 107, CPU 105, or the ground station computer 100 is sent through the ground transmitter/receiver 108. The ground transmitter/receiver 108 also receives data from the UAV control system 51 (shown in FIG. 2). In an embodiment an RC controller 110 in electronic communication with the ground control station 8 (shown in FIG. 1) may be provided. The CPU 105 may also be connected to an RC unit 110 with RC antenna 111 that can be used to control the UAV 3 (shown in FIG. 1) using RC signals.

Access Management System.

Figure 4:
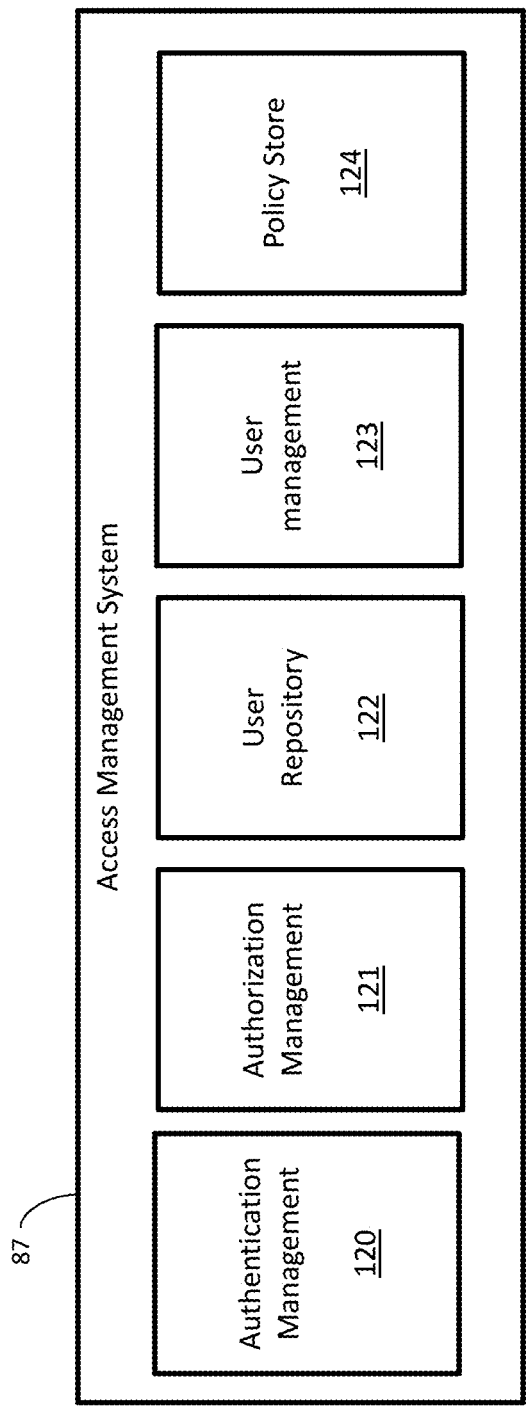
FIG. 4 is a system diagram of an embodiment of an access management system.

Illustrated in FIG. 4 is an embodiment of an access management system 87 in accordance with the present invention. The access management system 87 includes an authentication management module 120, and authorization management module 121, a user repository module 122 and a user management module 123.

Authentication is a process by which a system verifies the identity of a User who wishes to access it. Since access control is normally based on the identity of the User who requests access to a resource, authentication is essential. The process normally consists of four steps:
1. The user makes a claim of identity.
2. The system challenges the user to prove his or her identity.
3. The user responds to the challenge by providing the requested proof.
4. The system verifies that the user has provided acceptable proof.

There are several ways to authenticate a person or information on a computer. One way of authenticating a person is through the use of a user name and password. The user enters the user's name and password when prompted by the system. The authentication management module 120 checks the pair against a secure file to confirm. If either the name or the password does not match, then the user is not allowed further access. A more sophisticated form of authentication may include some form of biometrics for authentication. Biometrics uses biological information to verify identity. Biometric authentication methods include: fingerprint scan; retina scan; face scan; and voice identification.

The authentication management module 120 is the module through which a user provides sufficient credentials to gain initial access to an application system or a particular resource. Once a user is authenticated, a session is created and referred during the interaction between the user and the application system until the user logs off or the session is terminated by other means (e.g. timeout). The authentication management module 120 usually comes with a password service module when the userid/password authentication method is used.

The authorization management module 121 is the module that determines whether a user is permitted to provide input to UAV control system 51. The level of authorization of a user is determined by examining the additional properties (metadata) associated with the user's account. For example, data associated with a user may indicate if they are a member of a given group such as "Owner," "Administrator," "Manager," "Operator" or "Customer", or it may indicate that they are still within a time interval or geographic location for access.

Authorization is performed by checking the resource access request against authorization policies that are stored in a policy store 124 of the access management system 87. The authorization management module 121 is the core module that implements role-based access control. Moreover, the authorization model could provide complex access controls based on data or information or policies including user attributes, user roles/groups, actions taken, access channels, time, resources requested, external data and mission rules. Authorization management module 121 provides the functionality to create the authorization rules. For example, it may allow an administrator to create a rule to allow another user to have control of a UAV to perform a specified mission. The determination of whether the user has authorization may be based on one or more criteria such as the role of the user, a membership of the user in a group, a location of the user, a time and a transaction type. Authorization management may use parameters such as predefined groups, predefined roles, predefined privileges and predefined permissions to define these rules.

The user repository module 122 may store and deliver identity information to other services, and provide service to verify credentials submitted from users.

The user management module 123 is comprised of user management, password management, role/group management and user/group provisioning functionality. The user management module 123 defines the set of administrative functions such as identity creation, propagation, and maintenance of user identity and privileges.

Mission Policy Management System.

Figure 5:
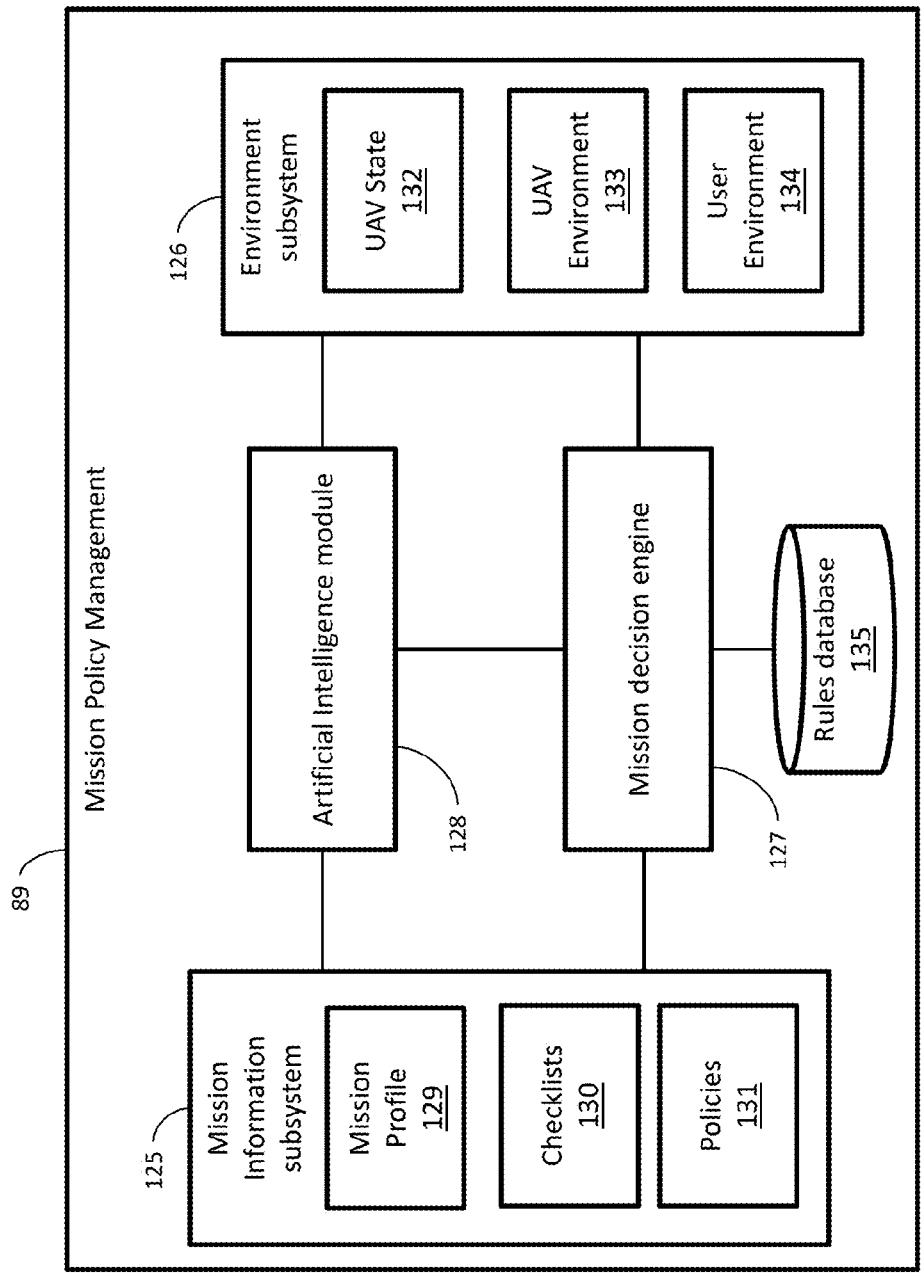
FIG. 5 is a system diagram of an embodiment of a mission policy management system.

Illustrated in FIG. 5 is the mission policy management system 89. The mission policy management system 89 may include a mission information subsystem 125 and an environment subsystem 126. The mission information subsystem 125 and the environment subsystem 126 are coupled to a mission decision engine 127. Mission decision engine 127 may be coupled to an artificial intelligence module 128.

The mission information subsystem 125 may include a mission profile module 129 that stores and processes mission profile information relating to the type of mission such as reconnaissance, attack, payload delivery, and the like. Associated with each mission profile will be a set of mission parameters such as regions that must be visited or avoided, time constraints, time of year, flight altitude, flight latitude, and payload mass and power, initial position of the target, direction of a target, and flight path, among others.

The mission information subsystem 125 may include a checklist module 130 that stores and processes checklists to ensure that the UAV is performing correctly during flight. Prior to and during operation, the unmanned vehicle may undergo one or more verification procedures that are performed according to one or more corresponding checklists. The checklists in the checklist module 130 generally include a sequence of various operating parameters to be verified for proper functionality and/or control actions to be taken once required operational parameters have been achieved. For example, a particular checklist implemented prior to take off may include verification of the unmanned vehicle's fuel supply and other suitable operating parameters. In addition to a checklist implemented for use with takeoff, other checklists may be implemented for other tasks performed by unmanned vehicles, such as a change in flight plan, or in response to specific events or situations that may arise during any particular mission.

The mission information subsystem 125 may also include a policies module 131. Policies module 131 may include a set of policies related to the level of control to be provided to a user that has been authorized by the access management system 87. Parameters for policies may include UAV and target location, customer and operator preferences, UAV status (e.g. power, type, etc.), next mission on the list, available resources and the like.

The environment subsystem 126 may include a UAV state module 132 which may include information about the state of the UAV such as power, payload capacity, distance to user, location and the like.

The environment subsystem 126 may also include a UAV environment module which may include information about the environment in which the UAV is operating such as weather, threat level and the like.

The environment subsystem 126 may also include a user environment module which may include information about the environment in which the ground-based user is operating, such as weather, location, terrain, threat level and the like.

The mission information subsystem 125 and the environment subsystem 126 may be coupled to the mission decision engine 127 configured to receive mission parameters from the mission information subsystem 125, fetch a plurality of mission plans from the mission profile module 129, and select one of the plurality of mission profiles based upon the current requirements and the environmental parameters. The mission decision engine 127 may access a rules database (not shown) that provides rules to the mission decision engine 127.

The artificial intelligence module 128 may include an inference engine, a memory (not shown) for storing data from the mission decision engine 127, heuristic rules, and a knowledge base memory (not shown) which stores network information upon which the inference engine draws. The artificial intelligence module 128 is configured to apply a layer of artificial intelligence to the mission profiles stored in the mission profile module 129 to develop relationships between mission parameters to perform and improve the assessments, diagnoses, simulations, forecasts, and predictions that form the mission profile. The artificial intelligence module 128 recognizes if a certain action (implementation of mission parameters) achieved a desired result (successfully accomplishing the mission). The artificial intelligence module 128 stores this information and attempts the successful action the next time it encounters the same situation. The mission policy management system 89 may be incorporated in the UAV or may be a component of the network 12.

Figure 6:
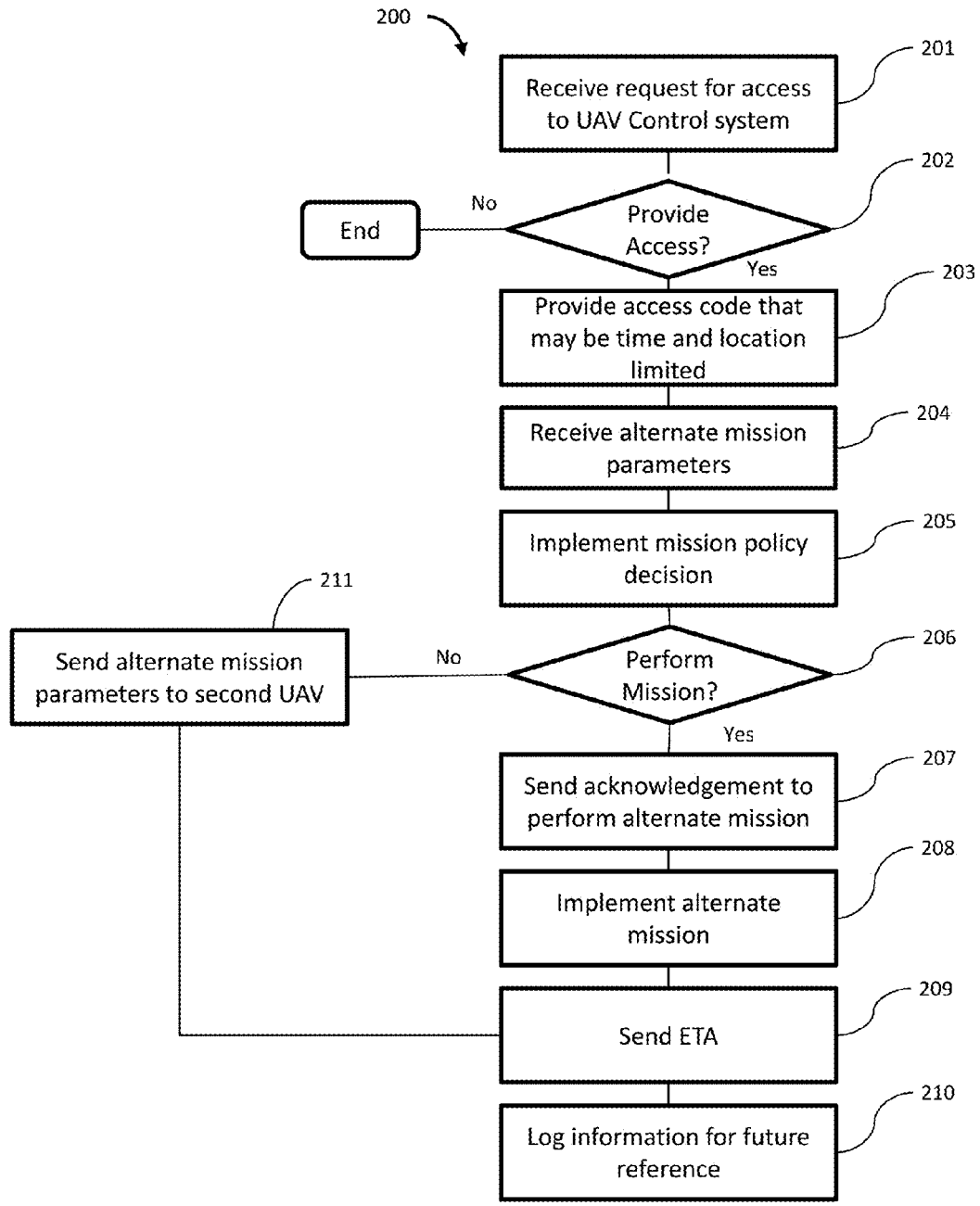
FIG. 6 is a flow diagram of an embodiment of a method for dynamically and intelligently enabling access to UAVs in any location.

Illustrated in FIG. 6 is an embodiment of a method 200 for controlling an unmanned vehicle such as a UAV.

In step 201 the UAV control system 51 receives a request from a user for access to the UAV control system 51.

In step 202 the access management system determines whether to grant access to the user. The determination to grant depends on whether the user group is an open or closed user group. A closed user group is a predetermined group of users that have been granted access to the UAV control system 51. An open user group is a group of users whose access is determined by an access management system 87. In that case, the access management system 87 controls access to resources based on predetermined criteria. In one embodiment the criteria may be identity. The identity is usually unique in order to support individual accountability and may include a username, a device id or the like. To provide access to the control system the identity must be authenticated. Authentication is the process for confirming the identity of the user. The typical authentication process allows the system to identify the user (typically via a username), and then validate their identity through user-provided evidence such as a password. Authentication may be provided by something a person is, has or does. For example authentication may be accomplished by the use of biometrics, passwords, passphrase, token or other private information. After authentication a determination must be made as to whether the user is authorized to access the system. The decision of whether or not to allow users to access the UAV control system 51 is based on access criteria. Authorization determines that the proven identity has some set of characteristics associated with it that gives it the right to access the requested resources. The different access criteria can be broken up into different types, roles, groups, location, time, and transaction types. For example, access to the control system may also be controlled by the job assignment or function (i.e., the role) of the user who is seeking access. Using groups is a way of assigning access control rights. If several users require the same type of access to the control system and resources, putting them into a group and then assigning rights and permissions to that group is easier to manage than assigning rights and permissions to each and every individual separately. Access to control system may be based upon physical location of the user. Time-of-day restrictions are another type of limitation on access. Mission-based restrictions can be used to control access to the system based on the mission requested by the user.

In step 203 the access management system 87 may provide the user with an access code that may be time and location limited.

In step 204 the access management system 87 may receive a set of alternate mission parameters that define an alternate mission that the user desires to be implemented by the UAV (such as UAV 3 in FIG. 1).

In step 205 the access management system 87 may determine whether the alternate mission may be performed. This determination may be based on information stored in the mission information subsystem 125. The information stored in the mission information subsystem 125 may include mission profiles, checklists, and mission policies. The information about mission profiles may include information about prior decisions to perform other missions. The determination may also be based on information stored in the environment subsystem 126. The information stored in the environment subsystem 126 may include information about the state of the UAV such as for example the location of the UAV, the UAV type, power remaining, payload capacity, distance to user and the like. The information stored in the environment subsystem 126 may include information about the UAV environment, such as weather, terrain, threat environment and the like. The information stored in the environment subsystem 126 may also include information about the user environment such as weather, terrain, threat environment and the like.

In step 206 the mission decision engine 127 decides whether the alternate mission can be performed. The decision of whether to perform the alternate mission is based in part on information provided by the artificial intelligence module 128 which includes computer algorithms that improve automatically through experience and through the analysis and processing of previous mission parameters.

If the alternate mission can be performed, then in step 207 the control system may send an acknowledgment to the user that the alternate mission will be performed.

In step 208 the control system causes the UAV to perform the alternate mission.

In step 209 the control system may send the user an estimated time of arrival for the UAV at the secondary mission location.

In step 210 the control system may store information about the alternate mission for use by the artificial intelligence module 128 in deciding about future missions.

If the alternate mission cannot be performed, then in step 211 the control system may identify a second UAV (e.g. UAV 2 in FIG. 1) that may be capable of performing the alternate mission and send alternate mission parameters to UAV 2.

Figure 7:
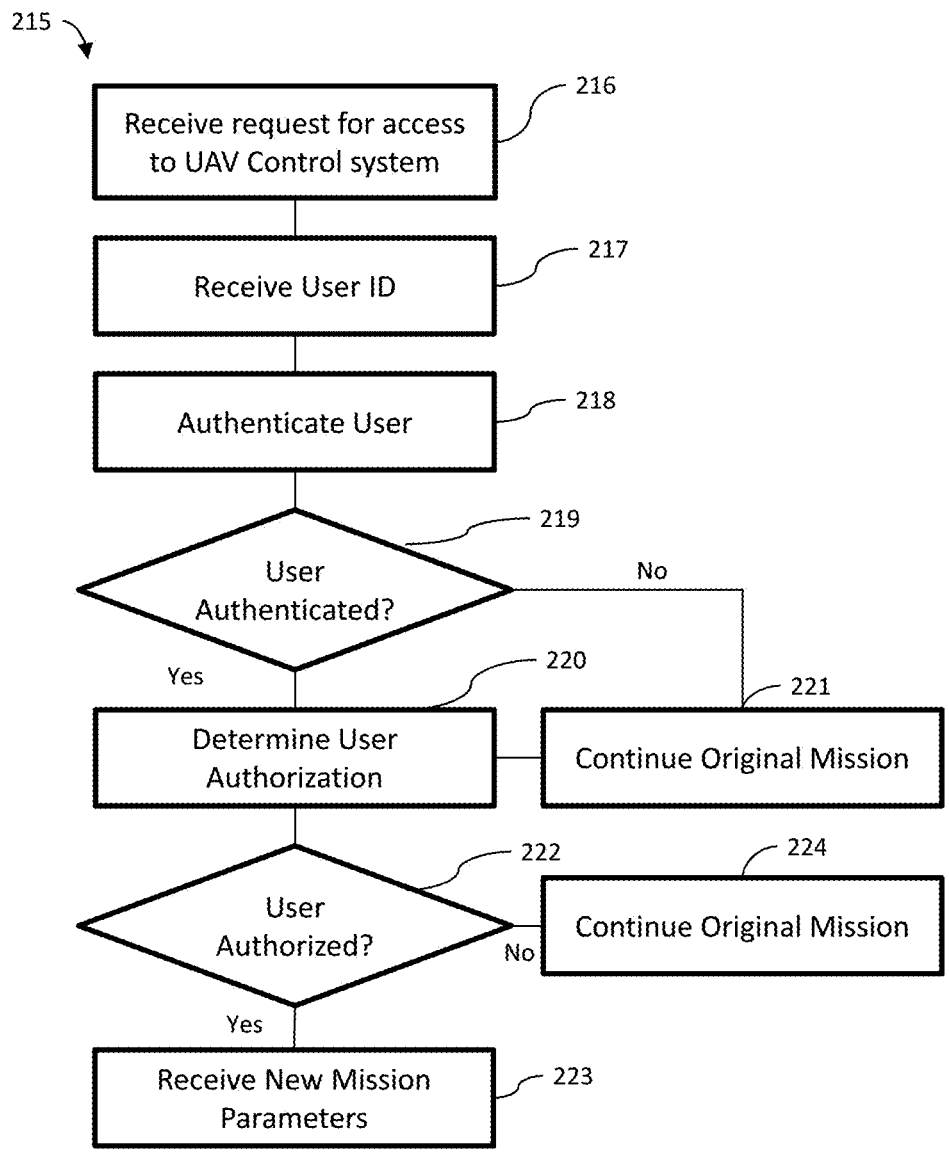
FIG. 7 is a flow diagram of an embodiment of a method for authenticating and authorizing a user.

FIG. 7 illustrates an embodiment of a method 215 for authenticating and authorizing a user.

In step 216 the UAV control system 51 receives a request for access.

In step 217 the UAV control system 51 receives a user ID.

In step 218 the UAV control system 51 authenticates the user.

In step 219 the UAV control system 51 determines whether the user is authenticated.

If the user is authenticated, then in step 220 the UAV control system 51 determines whether the user has authorization to change the mission parameters for the UAV.

If the user is not authenticated, then in step 221 the UAV continues with its original mission.

In step 222 the UAV control system 51 determines whether the user is authorized to change the mission parameters.

If the user is authorized to change the mission parameters, then in step 223 UAV control system 51 receives the new mission parameters.

If the user is not authorized to change the mission parameters, then in step 224 the UAV continues with this original mission.

Figure 8:
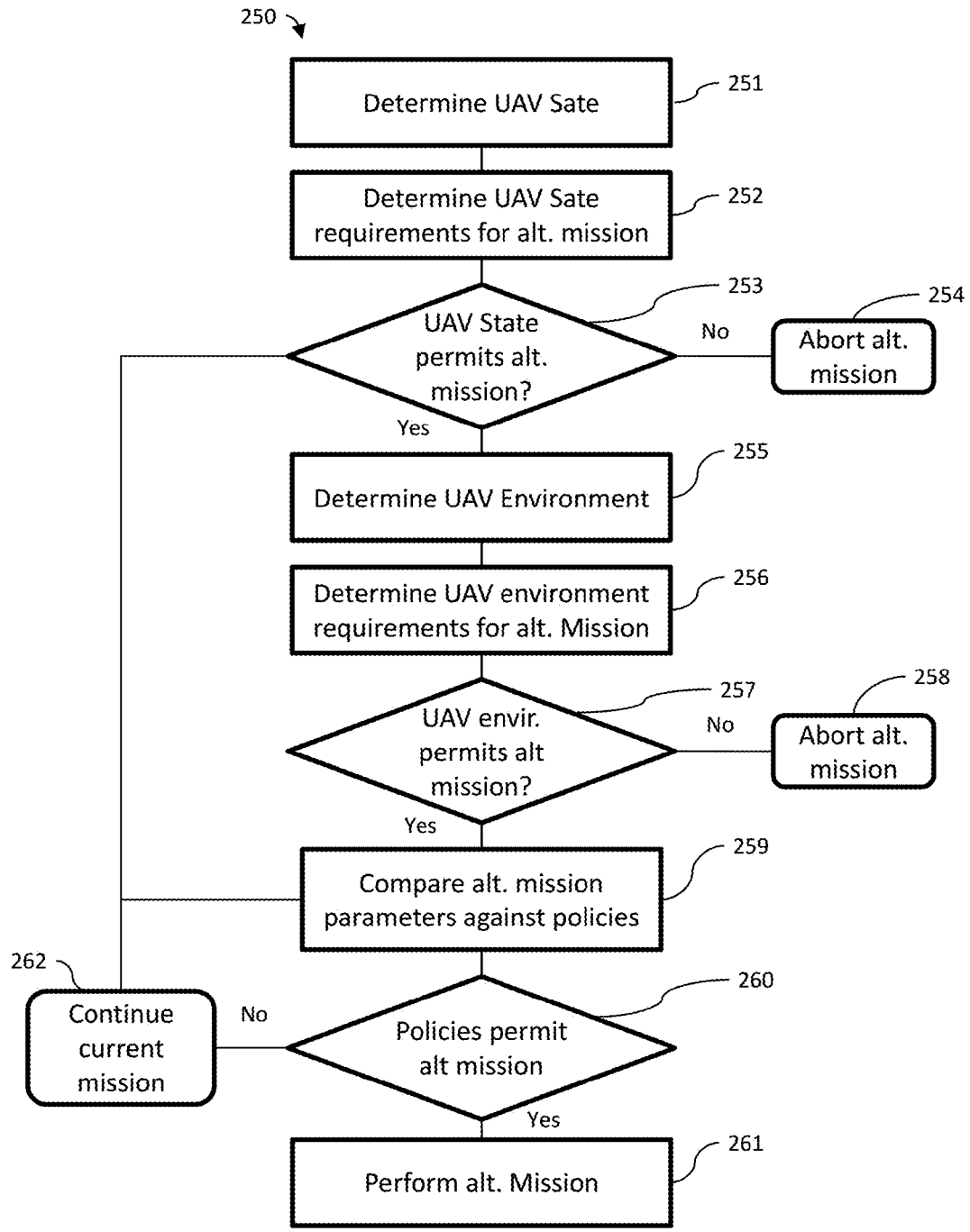
FIG. 8 is a flow diagram of an embodiment of a method for controlling an unmanned vehicle.

FIG. 8 is a flow chart illustrating a method 250 for authorizing an alternate mission in an unmanned vehicle such as a UAV.

In step 251 the UAV control system 51 determines the UAV state.

In step 252 the UAV control system 51 determines the UAV state requirements for an alternate mission.

In step 253 the UAV control system 51 determines whether the UAV state permits implementation of the alternate mission.

If the UAV state does not permit the implementation of the alternate mission, then the alternate mission is aborted in step 254.

If the UAV state permits the implementation of the alternate mission then in step 255 UAV control system 51 determines the UAV environment.

In step 256 the UAV control system 51 determines the UAV environment requirements for the alternate mission.

In step 257 UAV control system 51 determines whether the UAV environment requirements for the alternate mission permit implementation of the alternate mission.

If the UAV environment requirements for the alternate mission do not permit the implementation of the alternate mission then the alternate mission is aborted in step 258.

If the UAV environment requirements for the alternate mission permit the implementation of the alternate mission then in step 259 the UAV control system compares the alternate mission parameters against a set of pre-established policies.

In step 260 the UAV control system 51 determines whether the pre-established policies permit the alternate mission.

If the pre-established policies permit the alternate mission then in step 261 the UAV control system 51 implements the alternate mission.

If the pre-established policies do not permit the alternate mission then in step 262 the UAV control system 51 continues with the current mission.

In an example of an embodiment of, a user receives a package from a shipping company. While the UAV is in the vicinity the user requests access to the UAV to have it come to a given location and pick up a package. The request for access may be accomplished either dynamically through an Over The Top (OTT) application or directly communicating with the operator of the ground control station 8. The customer receives an authorization code from the access management system 87 that would allow access within a limited time in certain location. Once the UAV receives the mission parameters from the user, the mission policy management system 89 determines whether to perform the alternate mission taking into account mission parameters such as available resources (for example remaining power, package size limitations), priority setting (existing mission versus or combined new mission), weather and other variables. The mission policy management system 89 either sends acknowledgment to perform the alternate mission or as an option sends the mission parameters to other available UAVs in the vicinity that are equipped and willing to perform the task either with the same agreement as the existing UAV (from same company for same fees) or sending an acknowledgment with added fees (for 3rd party company).

In an example of an embodiment, the system may be deployed in a situation where a scout team is investigating an area. The head of scout team sends a request to military UAVs in the area to fly over a location ahead and send information (sensory reading, picture, etc.) to the requester. A UAV in the vicinity receives the information, grants access to the requester to communicate the mission parameters to the UAV. The UAV checks with its policy to determine the ranking of the requestor vs existing request and makes intelligent decision to either accept the mission fly over and preform the alternate mission or send the mission request to other UAVs it is in communication with to complete the task. Parameters that may be analyzed include location, security level and operator preferences, UAV status (power, type, etc.), next mission on the list, and available resources. If the UAV is unable to perform the alternate mission the UAV will communicate with other UAVs in the area to enable determination of a UAV that can carry out the alternate mission. If the UAV can carry out the alternate mission then the UAV control system will grant access to the controls of the UAV with limitations such as time, access level location and level of access. In case that a secondary UAV will perform the task, the first UAV will communicate the ETA and detail to the requestor and log the information for future references.

Although not every conceivable combination of components and methodologies for the purposes describing the present invention have been set out above, the examples provided will be sufficient to enable one of ordinary skill in the art to recognize the many combinations and permutations possible in respect of the present invention. Accordingly, this disclosure is intended to embrace all such alterations, modifications and variations that fall within the spirit and scope of the appended claims. For example, numerous methodologies for authentication and authorization are known in the art and any sort of authentication and authorization method are encompassed within the concepts of authentication and authorization.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:
receiving at an unmanned aerial vehicle control system in an unmanned aerial vehicle that is implementing a first mission under control of a first user using a first user device, a request from a second user using a second user device for access to the unmanned aerial vehicle to perform an alternate mission;
verifying in an authentication management module an identity of the second user;
determining in an authorization management module, a determination of whether the second user is permitted to provide input to the unmanned aerial vehicle based on the alternate mission, identity of the second user, authentication of the second user and authorization of the second user;
if the determination is made to grant access then receiving alternate mission parameters for the alternate mission from the second user device;
accessing an environment subsystem having an unmanned aerial vehicle state module, an unmanned aerial vehicle environment module and a user environment module;
accessing an artificial intelligence module that develops relationships between mission parameters to perform and improve assessments, diagnoses, simulations, forecasts, and predictions that form a mission profile;
determining in a mission decision engine in the unmanned aerial vehicle control system a decision of whether to implement the alternate mission based on a set of predetermined policies, data from the artificial intelligence module a state of the unmanned aerial vehicle, information about where the unmanned aerial vehicle is operating, and information about where the second user is operating;
if the decision is to implement the alternate mission then instructing the unmanned aerial vehicle control system to implement the alternate mission under control of the second user;
saving the alternate mission parameters; and
if the decision is not to implement the alternate mission, then continuing with the first mission.

2. The method of claim 1 wherein the set of predetermined policies comprise one or more parameters selected from among a group comprising: location of the unmanned aerial vehicle, target location, user preferences, status of the unmanned aerial vehicle, next mission on a list, and available resources.

3. The method of claim 1 wherein determining whether the second user is permitted to provide input to the unmanned aerial vehicle comprises determining whether the second user has authorization based on at least one criteria selected from among a role of the second user, a membership of the second user in a group, a location of the second user, a time, and a transaction type.

4. The method of claim 1 wherein the state of the unmanned aerial vehicle comprises information about power, payload capacity, distance to the second user and location.

5. The method of claim 1 wherein the information about where the unmanned aerial vehicle is operating comprises information about weather, location, terrain, and threat level.

6. The method of claim 1 wherein saving the alternate mission parameters comprises saving the alternate mission parameters in a data store accessible by the artificial intelligence module.

7. A system comprising:
an unmanned vehicle;
an unmanned vehicle control system disposed in the unmanned vehicle that controls the unmanned vehicle and that while the unmanned vehicle is under control of a first user, is configured to receive a request from a second user for access to the unmanned vehicle to perform an alternate mission;
an access management system disposed in the unmanned vehicle that controls access by the second user to the unmanned vehicle control system; and
a mission policy management system coupled to the unmanned vehicle control system comprising:
a mission information subsystem having:
a checklist module that stores and processes checklists to ensure that the unmanned vehicle is performing correctly;
a policies module having a set of policies related to a level of control to be provided to a user;
an environment information subsystem having:
a vehicle state module;
a vehicle environment module; and
a user environment module;
an artificial intelligence module including an inference engine, a memory for storing heuristic rules and network information; and
a mission decision engine coupled to the mission information subsystem, the environment information subsystem, and the artificial intelligence module configured to determine whether to implement the alternate mission based on a set of predetermined policies, data from the artificial intelligence module, state of the unmanned vehicle, information about where the unmanned vehicle is operating, and information about where the second user is operating.

8. The system of claim 7 wherein the mission information subsystem comprises a mission profile module that stores and processes mission profile information.

9. The system of claim 8 wherein the mission decision engine is configured to receive mission parameters from the mission information subsystem.

10. The system of claim 7 wherein the vehicle state module stores information about power, payload capacity, distance to user and location.

11. The system of claim 7 wherein the vehicle environment module stores information about an environment in which the unmanned vehicle is operating.

12. A method of controlling an unmanned vehicle controlled by a first user comprising:
determining at a control system in the unmanned vehicle whether a second user has authorization to control the unmanned vehicle;
if the second user has authorization, then receiving alternate mission parameters from the second user;
determining in a mission decision engine whether to perform an alternate mission based on input from an artificial intelligence module coupled to the mission decision engine, the alternate mission parameters, a set of policies, information about a state of the unmanned vehicle, information about where the unmanned aerial vehicle is operating, and information about where the second user is operating;
if it is determined that the alternate mission should be performed, then: performing the alternate mission; and storing the alternate mission parameters; and
if it is determined that the alternate mission should not be performed then determining in the mission decision engine whether there is a second unmanned vehicle that may be capable of performing the alternate mission.

13. The method of controlling an unmanned vehicle of claim 12 wherein the set of policies comprise a set of hierarchical security policies.

14. The method of controlling an unmanned vehicle of claim 12 wherein the information about the state of the unmanned vehicle comprises information about available power, payload capacity, and distance to user.

15. The method of controlling an unmanned vehicle of claim 12 further comprising storing information from the step of determining whether to perform the alternate mission.

16. The method of controlling an unmanned vehicle of claim 15 wherein determining whether to perform the alternate mission comprises accessing a store of information about prior decisions to perform other missions and determining whether to perform the alternate mission based on stored information about prior decisions to perform other missions.

17. The method of controlling an unmanned vehicle of claim 16 wherein determining whether to perform the alternate mission based on stored information about prior decisions to perform other missions is performed by the artificial intelligence module.

* * * * *

UNITED STATES PATENT AND TRADEMARK OFFICE
CERTIFICATE OF CORRECTION

PATENT NO. : 10,291,764 B2  
APPLICATION NO. : 15/193993  
DATED : May 14, 2019  
INVENTOR(S) : Sangar Dowlatkhah et al.

Page 1 of 1

It is certified that error appears in the above-identified patent and that said Letters Patent is hereby corrected as shown below:

In the Claims

Claim 12, Column 12, Line 60, after "unmanned" delete "aerial".

Signed and Sealed this  
Third Day of March, 2020

Andrei Iancu  
*Director of the United States Patent and Trademark Office*